United States Patent
Morita

[11] Patent Number: 6,091,224
[45] Date of Patent: Jul. 18, 2000

[54] BATTERY PACK HAVING RECESSED AREA FOR RECEIVING BATTERY CHARGER

[75] Inventor: Hideyo Morita, Mihara-gun, Japan

[73] Assignee: Sanyo Electric Co., Ltd., Osaka, Japan

[21] Appl. No.: 09/094,983

[22] Filed: Jun. 15, 1998

[30] Foreign Application Priority Data

Jun. 24, 1997 [JP] Japan ................................ 9-167192

[51] Int. Cl.$^7$ .................................................. H01M 10/46
[52] U.S. Cl. ...................... 320/113; D13/103; D13/107; 429/100
[58] Field of Search .................... 320/111, 112, 320/113; D13/103, 106, 107; 429/96, 100, 170

[56] References Cited

U.S. PATENT DOCUMENTS

| 5,019,767 | 5/1991 | Shirai et al. ............................ 320/112 |
| 5,146,149 | 9/1992 | Nilssen ..................................... 320/2 |
| 5,317,247 | 5/1994 | Chong et al. ........................... 320/112 |
| 5,481,177 | 1/1996 | Hamley .................................... 320/23 |
| 5,510,694 | 4/1996 | Nilssen .................................... 320/39 |
| 5,607,794 | 3/1997 | Koenig ................................... 429/100 |

FOREIGN PATENT DOCUMENTS 2 282 715  4/1995  United Kingdom .

*Primary Examiner*—Edward H. Tso
*Attorney, Agent, or Firm*—Wenderoth, Lind & Ponack, L.L.P.

[57] ABSTRACT

A battery pack contains rechargeable batteries, and is provided with a recessed area to insert a battery charger for charging. The recessed area has battery contacts to make electrical connection with a battery charger inserted within it. In this invention, the battery pack is not inserted into a recessed region of a battery charger, but rather the battery charger is inserted into the recessed area provided on the battery pack to charge the rechargeable batteries.

11 Claims, 2 Drawing Sheets

6,091,224

BATTERY PACK HAVING RECESSED AREA FOR RECEIVING BATTERY CHARGER

This application is based on application No. 9-167192 filed in Japan on Jun. 24, 1997, the content of which incorporated hereinto by reference.

BACKGROUND OF THE INVENTION

This Invention Relates to a Battery Pack.

A battery pack which contains rechargeable batteries such as nickel cadmium batteries, nickel hydrogen batteries, or lithium ion batteries, which is charged repeatedly, is charged using a battery charger. The battery pack to be charged is either directly attached to a battery attachment section on the battery charger or is electrically connected to the battery charger via a special purpose connecting cord.

Recently, battery packs have come to be used in applications such as electric bicycles and electric cars. Battery packs for these applications become extremely large. If these large scale battery packs are to be charged by attachment to a battery charger provided with a battery attachment section, the battery charger must be made extremely large. On the other hand, charging by using a connecting cord to connect the battery pack and battery charger is not a good method of operation.

Thus it is an object of the present invention to provide a battery pack which can be charged simply without requiring a large scale battery charger or special purpose connecting cord.

The above and further objects and features of the invention will more fully be apparent from the following detailed description with accompanying drawings.

SUMMARY OF THE INVENTION

The battery pack of the present invention contains rechargeable batteries. Further, the battery pack has a recessed area for insertion of a battery charger to charge the rechargeable batteries contained within. Battery contacts are provided inside this recessed area for electrical connection with the inserted battery charger.

In a battery pack of this configuration, a battery charger is inserted into the recessed area provided on the battery pack, the battery contacts connect with the battery charger, and the rechargeable batteries contained in the battery pack are charged. With this configuration, the battery pack is not inserted into a recessed area on the battery charger as in prior art, but rather the battery charger is inserted into the recessed area on the battery pack for battery charging. As a result of this configuration, a large scale battery pack can be simply and conveniently charged by a small battery charger.

Further, in addition to the recessed area, the battery pack of the present invention is preferably provided with a cord holder to support and retain the battery charger power cord.

Still further, in the battery pack of the present invention, the recessed area for battery charger insertion can have a dual purpose as a carrying handle for carrying the battery pack.

DETAILED DESCRIPTION OF THE INVENTION

Figure 1:
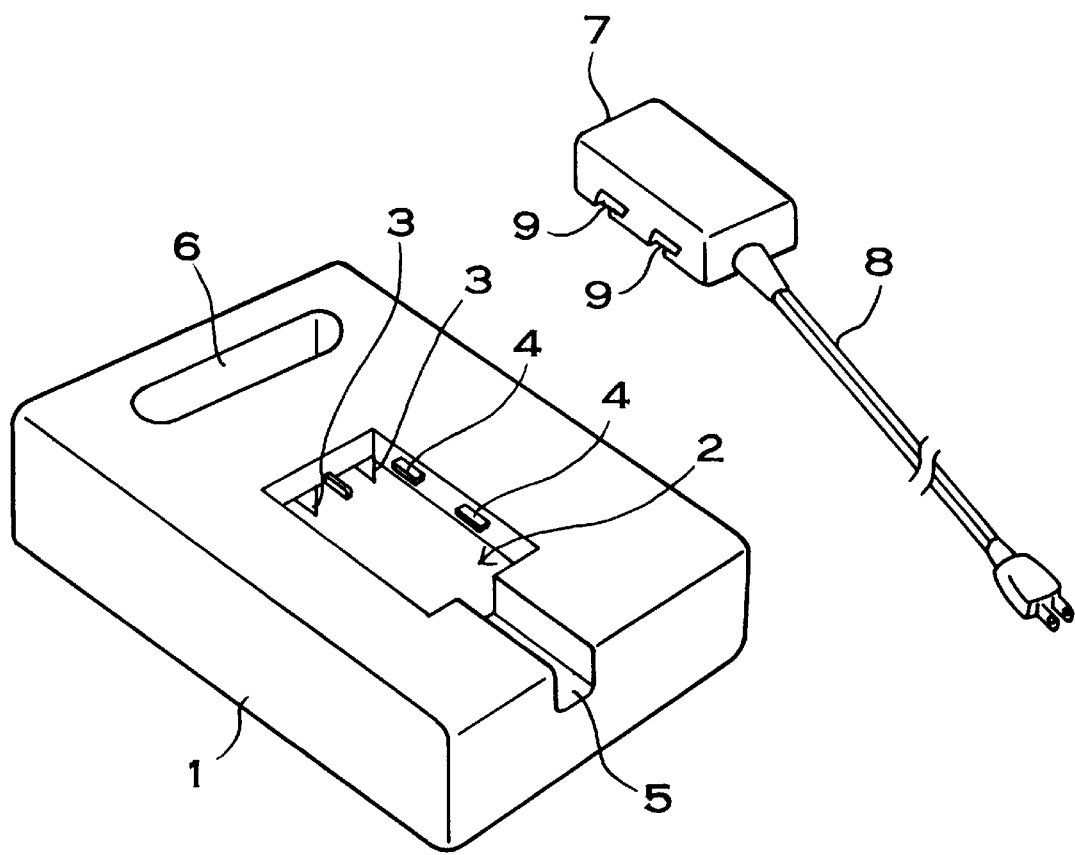
FIG. 1 is an oblique view showing a first embodiment of the present invention.

Turning to FIG. 1, an oblique view of the first embodiment of the present invention is shown. In FIG. 1, 1 is a battery pack containing rechargeable batteries such as nickel cadmium batteries, nickel hydrogen batteries, or lithium ion batteries (not shown in the FIG.). 7 is a battery charger for charging the rechargeable batteries contained in the battery pack 1. The battery charger 7 is smaller in size than the battery pack 1.

Further, 2 is a recessed area provided near the center of one side of the battery pack 1, and formed to allow insertion and attachment of the battery charger 7. 3 is a pair of battery contacts exposed from the bottom surface of the recessed area 2. 4 are locking projections provided on the side-walls of the recessed area 2, 5 is a groove extending from the recessed area 2 to one side-wall of the battery pack 1, and 6 is a handle formed near the side-wall of the battery pack 1 opposite the groove 5.

Likewise, 8 is a power cord extending from the battery charger 7, and 9 are locking grooves provided on the side-walls of the battery charger 7 which mate with the locking projections 4. Finally, although not shown in the FIG., a pair of charging contacts which make electrical connection to the pair of battery contacts 3 are provided on the bottom surface of the battery charger 7.

In this embodiment of the battery pack 1, the battery charger 7 is inserted into the recessed area 2 and the locking projections 4 slide into the locking grooves 9. In addition, the battery charger 7 power cord 8 is disposed within the battery pack 1 groove 5. In this configuration, the battery contacts 3 of the battery pack 1 are electrically connected with the charging contacts of the battery charger 7 and charging of the rechargeable batteries contained within the battery pack 1 is performed.

Since the power cord 8 is disposed within the groove 5 in this situation, even if the power cord 8 is accidentally pulled, the pulling force is not directly applied to the battery charger 7. Consequently, the state of contact between the battery contacts 3 of the battery pack 1 and the charging contacts of the battery charger 7 is maintained in a stable condition.

In place of the groove 5, or in addition to the groove 5, a hook to retain the power cord 8 may be provided on one of the side-walls of the battery pack 1. When a retaining hook is provided, electrical contact between the battery pack 1 and the battery charger 7 is still further improved.

Figure 2:
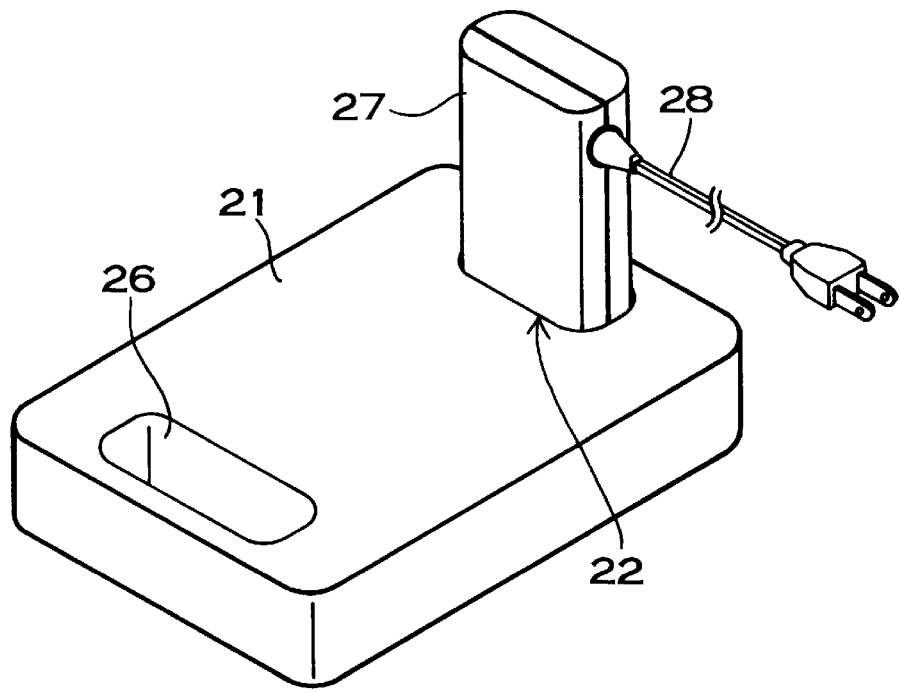
FIG. 2 is an oblique view showing a second embodiment of the present invention.

Turning to FIG. 2, an oblique view of the second embodiment of the present invention is shown. In this battery pack embodiment, the battery charger 27 is inserted into a recessed area 22 in a standing orientation. Further, a power cord 28 is provided on a plane of the battery charger 27 which is perpendicular to the plane with charging contacts. As a result, good electrical connection between the contacts of the battery pack 21 and the battery charger 27 is maintained even if the power cord 28 is pulled.

Still further, although it is not shown in the FIG., the heat generating elements of the internal charging circuitry of the battery charger 27 (transformer, transistors, etc.) are positioned in the part of the battery charger 27 which protrudes out from the battery pack 21. Consequently, heat generated by the battery charger 27 is not conducted directly to the battery pack 21, and the detrimental effects of heat on the battery pack 21 can be avoided. A handle 26 is provided in the battery pack 21 opposite the recessed area 22.

Figure 3:
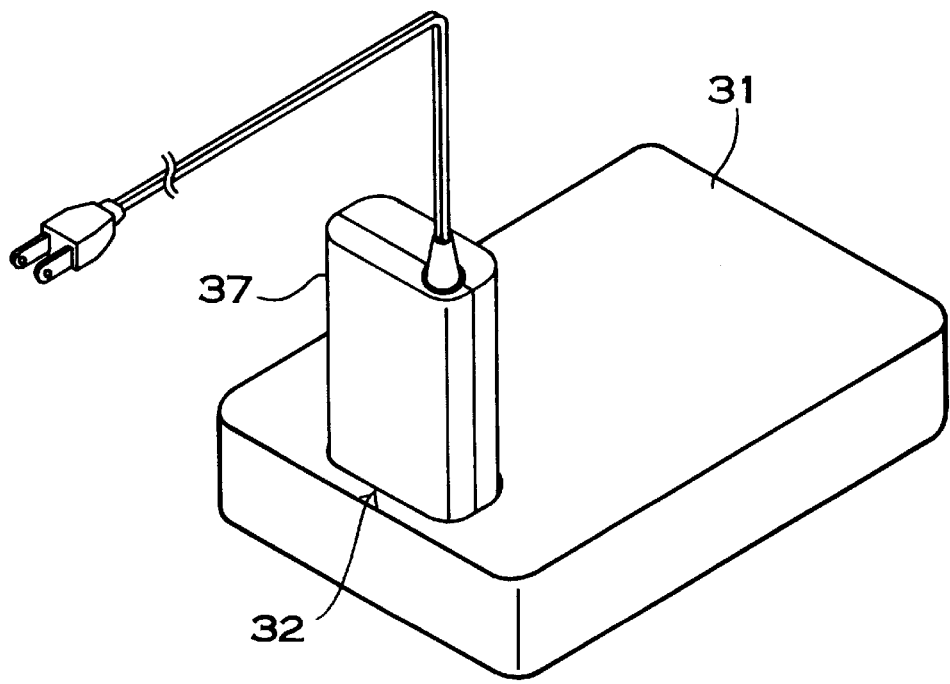
FIG. 3 is an oblique view showing a third embodiment of the present invention.

Turning to FIG. 3, the third battery pack embodiment of the present invention is shown. In this embodiment, the handle 26 of the second battery pack embodiment shown in FIG. 2 serves also as a recessed area 32 for insertion of the battery charger 37. Consequently, the battery pack 31 can be made smaller.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims.

What is claimed is:

1. A battery pack and battery charger combination, comprising:

a battery pack containing rechargeable batteries and having a recessed area and battery contacts provided in said recessed area;

a battery charger including a charger body and charger contacts provided on said charger body; and wherein said charger body is smaller than said battery pack and is sized to be bodily inserted into and mate in said recessed area of said battery pack so as to make electrical connection with said battery contacts and such that a portion of said charger body protrudes out of said recessed area of said battery pack.

2. A battery pack and battery charger combination as recited in claim 1, wherein:

said battery charger further includes a power cord extending from said charger body.

3. A battery pack and battery charger combination as recited in claim 2, wherein:

said battery pack includes a power cord restraint for holding said power cord when said charger body is received in said recessed area of said battery pack.

4. A battery pack and battery charger combination as recited in claim 3, wherein:

said power cord restraint comprises a groove formed in said battery pack extending from said recessed area to a side-wall of said battery pack.

5. A battery pack and battery charger combination as recited in claim 3, wherein:

said power cord restraint comprises a restraining hook that holds said power cord when said battery charger body is received in said recessed area.

6. A battery pack and battery charger combination as recited in claim 1, wherein:

said recessed area is formed in a center region of one surface of said battery pack.

7. A battery pack and battery charger combination as recited in claim 1, wherein:

said battery contacts are disposed within said recessed area of said battery pack.

8. A battery pack and battery charger combination as recited in claim 7, wherein:

said recessed area is defined by a recessed bottom surface and at least one recessed side-wall; and said battery contacts protrude from said recessed bottom surface.

9. A battery pack and battery charger combination as recited in claim 7, wherein:

said recessed area is defined by a recessed bottom surface and at least one recessed side-wall;

said battery pack includes locking projections protruding from said at least one recessed side-wall; and said battery charger body has locking grooves formed therein for engaging with said locking projections.

10. A battery pack and battery charger combination as recited in claim 1, wherein:

said battery charger body has internal charging circuitry including heat-generating elements; and said heat-generating elements are disposed in said portion of said battery charger body that protrudes out of said recessed area of said battery pack when said battery charger body is received in said recessed area of said battery pack.

11. A battery pack and battery charger combination as recited in claim 1, wherein:

said recessed area of said battery pack is arranged so as to form a handle for carrying said battery pack.

* * * * *